United States Patent
Malmer et al.

(10) Patent No.: US 7,155,490 B1
(45) Date of Patent: Dec. 26, 2006

(54) SYSTEM AND METHOD FOR PROVIDING A WEB-BASED OPERATING SYSTEM

(75) Inventors: Fredrik Malmer, Alingsas (SE); Erik Viktor Arvidsson, Jonkoping (SE); Drew E. Morris, Alpine, NJ (US); Shervin Pishevar, Gaithersburg, MD (US)

(73) Assignee: Freewebs Corporation, Silver Spring, MD (US)

( * ) Notice: Subject to any disclaimer, the term of this patent is extended or adjusted under 35 U.S.C. 154(b) by 807 days.

(21) Appl. No.: 09/686,136

(22) Filed: Oct. 11, 2000

Related U.S. Application Data

(60) Provisional application No. 60/186,304, filed on Mar. 1, 2000.

(51) Int. Cl.
*G06F 15/16* (2006.01)
*G06F 9/44* (2006.01)
*G06F 9/445* (2006.01)

(52) U.S. Cl. .................. 709/217; 717/162; 717/163; 717/178; 709/219

(58) Field of Classification Search .............. 709/217, 709/219, 203, 250; 719/328, 330, 228, 229, 719/230; 717/174, 176, 177, 178; 707/162, 707/163, 164, 174, 176–178
See application file for complete search history.

(56) References Cited

U.S. PATENT DOCUMENTS 5,995,756 A * 11/1999 Herrmann ................ 717/178

(Continued)

OTHER PUBLICATIONS

Smith, Mark; "Thin Client/Server Computing Works" Nov. 1998. Retrieved from http://www.winnetmag.com/Articles/Print.cfm?ArticleID=3933 on Aug. 23, 2004.*
Johansen, D.; Marzullo, K.; Lauvset, K.; "An approach towards an agent computing environment" Electronic Commerce and Web-based Applications/Middleware, 1999. Proceedings. 19th IEEE International Conference, May 31-Jun. 4, 1999 pp. 78-83.*
Huang, Z.; Cranefield, S.; Chee, K.M.V.; Purvis, M.; "Technology of Object-Oriented Languages and Systems", 1999. TOOLS 31. Proceedings , Sep. 22-25, 1999 pp. 306-315.*
Kanter, Joel P.; "Understanding Thin-Client/Server Computer" Published by Microsoft Press. Copyright 1998 by Citrix Systems, Inc. Chapter 7: Thin-Client/Server Computing on the Web. pp. 143-159.*

*Primary Examiner*—William Vaughn
*Assistant Examiner*—Yemane M. Gerezgiher
(74) *Attorney, Agent, or Firm*—Charles A. Rattner

(57) ABSTRACT

A system and method for providing a web-based operating system is disclosed. A web-based operating system is downloaded from a server to a network-enabled device. The web-based operating system provides a platform from which to run web-based computer applications. Web-based computer applications are downloaded from the server onto the network-enabled device, and executed in conjunction with the web-based operating system. Those portions of the web-based operating system software and web-based computer application software are downloaded to the network-enabled device as needed. A component-based environment for the development and deployment of a web-based operating system and web-based computer applications is also provided. Components are deployed within library files as part of a component-based development model. The web-based operating system downloads those library files needed to execute the web-based computer applications.

21 Claims, 6 Drawing Sheets

U.S. PATENT DOCUMENTS

| | | | |
|---|---|---|---|
| 6,014,702 A * | 1/2000 | King et al. | 709/227 |
| 6,073,163 A * | 6/2000 | Clark et al. | 709/203 |
| 6,272,673 B1 * | 8/2001 | Dale et al. | 717/100 |
| 6,393,605 B1 * | 5/2002 | Loomans | 717/121 |
| 6,493,870 B1 * | 12/2002 | Madany et al. | 717/165 |
| 6,754,896 B1 * | 6/2004 | Mishra et al. | 717/176 |

* cited by examiner

SYSTEM AND METHOD FOR PROVIDING A WEB-BASED OPERATING SYSTEM

CROSS-REFERENCE TO RELATED APPLICATIONS

The present application claims priority to the following provisional application, which is incorporated herein by reference in its entirety: U.S. Provisional Application No. 60/186,304, entitled "SYSTEM AND METHOD FOR PROVIDING A WEB-BASED OPERATING SYSTEM," filed Mar. 1, 2000.

BACKGROUND

1. Field of the Invention

The present invention relates generally to Internet-based computer applications and more particularly to providing these applications to a user from a remote server.

2. Discussion of the Related Art

In conventional computer systems, a computer application operates within the confines of an operating system resident on a local computer. The operating system provides a layer of abstraction between the computer application and the operation of the physical computer hardware associated with the local computer. The operating system enables developers of the computer application to provide various functionality to a user regardless of the type of physical computer hardware owned by the user. For example, the operating system provides the computer application with access to hard drives, monitors, input/output ports, peripherals, and various other devices without having to understand the nature and operation of the particular piece of physical hardware associated with the local computer.

In conventional computer systems, the computer application is resident on the local computer. When the user wishes to access a particular computer application, the user selects the computer application via an operating system user interface to initiate or run the computer application. For example, in a Windows™ operating system, the user may select the particular computer application by "double-clicking" on an icon associated with the particular computer application from the "desktop" or selecting the particular computer application from a menu such as Windows™ "Program" menu. Once the particular computer application is selected, the operating system retrieves the particular computer application from a storage device at the local computer and runs it within the context of the operating system in a well-known manner.

With conventional computer systems, the user usually has to purchase a copy of each computer application that he intends to install and use on a computer. Often, these computer applications are expensive (i.e., paying for the installation of the application, or the per instance cost). When the application is purchased in this manner, the cost of a computer application on a per use basis is much higher for a casual user than a heavy user. It would be more economically efficient, if users paid for the computer application on a per use basis rather than on a per instance basis. The conventional configuration, however, does not provide a "pay-for-use" mechanism for the computer application.

Distribution is another problem associated with purchasing individual copies of a computer application. In conventional computer systems, computer applications are distributed to users via a software medium such as a floppy diskette. The user loads the computer application from the floppy diskette onto his local computer. Subsequent modifications to the application (e.g., corrections, modifications, additions, etc.) must be delivered to the user via a software medium as well, often times at additional expense to the user. To avoid this expense, many users simply retain an outdated (and often "buggy") version of the computer application. Moreover, developers may delay the release of "bug fixes" for long periods of time with the intent of releasing the "bug fixes" with newly developed features. Meanwhile, users "make do" with a less than perfect computer application.

Yet another problem associated with individual copies of a computer application is the wasteful use of computer storage media. For example, it is not uncommon that a computer application, when fully installed on a local computer, require tens of megabytes of storage space on a computer hard drive. Typically, the amount of storage space required greatly increases with each subsequent release of the computer application. While storage space is becoming cheaper every year (in terms of dollars/megabyte), much of storage space is occupied by code functions never utilized by the user. This problem is compounded by copies of a computer application installed by millions of users, resulting in large scale storage media inefficiencies.

In view of the shortcomings of known techniques for distributing and operating applications programs, it would be useful to have a system and method that provide an alternative technique for delivering an operating system and computer applications.

SUMMARY OF THE INVENTION

The present invention is directed to a system and method that solves the problems of conventional computer systems by providing a web-based operating system and web-based computer applications to a user via a network. A web-based operating system is downloaded from a server onto a network-enabled device. The web-based operating system provides a platform from which web-based computer applications are executed. Web-based computer applications are downloaded from a server onto the network-enabled device, and executed in conjunction with the web-based operating system.

According to one feature of the present invention, users access web-based computer applications on demand. When a user wishes to access a web-based computer application, the web-based computer application is downloaded from a server for use at a network-enabled device. The user may access and repeatedly download the web-based computer application as often as needed, rather than pay a high initial price for a conventional computer application. In this manner, the present invention provides a mechanism by which the user may "pay-for-use" of the web-based computer application. This solves the problem of the high initial cost of conventional computer applications.

According to another feature of the present invention, the web-based computer application software is distributed from a server when the user chooses to access the web-based computer application. When a new version of the web-based computer application software becomes available, it is released onto the server. Since the web-based computer application software is downloaded when the user wishes to execute the web-based computer application, the user always has access to the newest version of the software. This solves the problem of distribution of individual copies of a conventional computer application.

According to yet another feature of the present invention, portions of the web-based operating system software and web-based computer application software are downloaded from the server to the network-enabled device as needed. When a user first accesses the web-based operating system, the core software for operation of the web-based operating system are downloaded from the server to the network-enabled device. When the user accesses a web-based computer application, the web-based computer application software and any additional web-based operating system software needed are downloaded from the server. This results in storing only that software at the network-enabled device necessary for executing the web-based computer application. This solves the problem of wasted storage media associated with storing individual copies of conventional computer applications in conventional computer systems. This, and other advantages of the present invention are described below.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION

Figure 1:
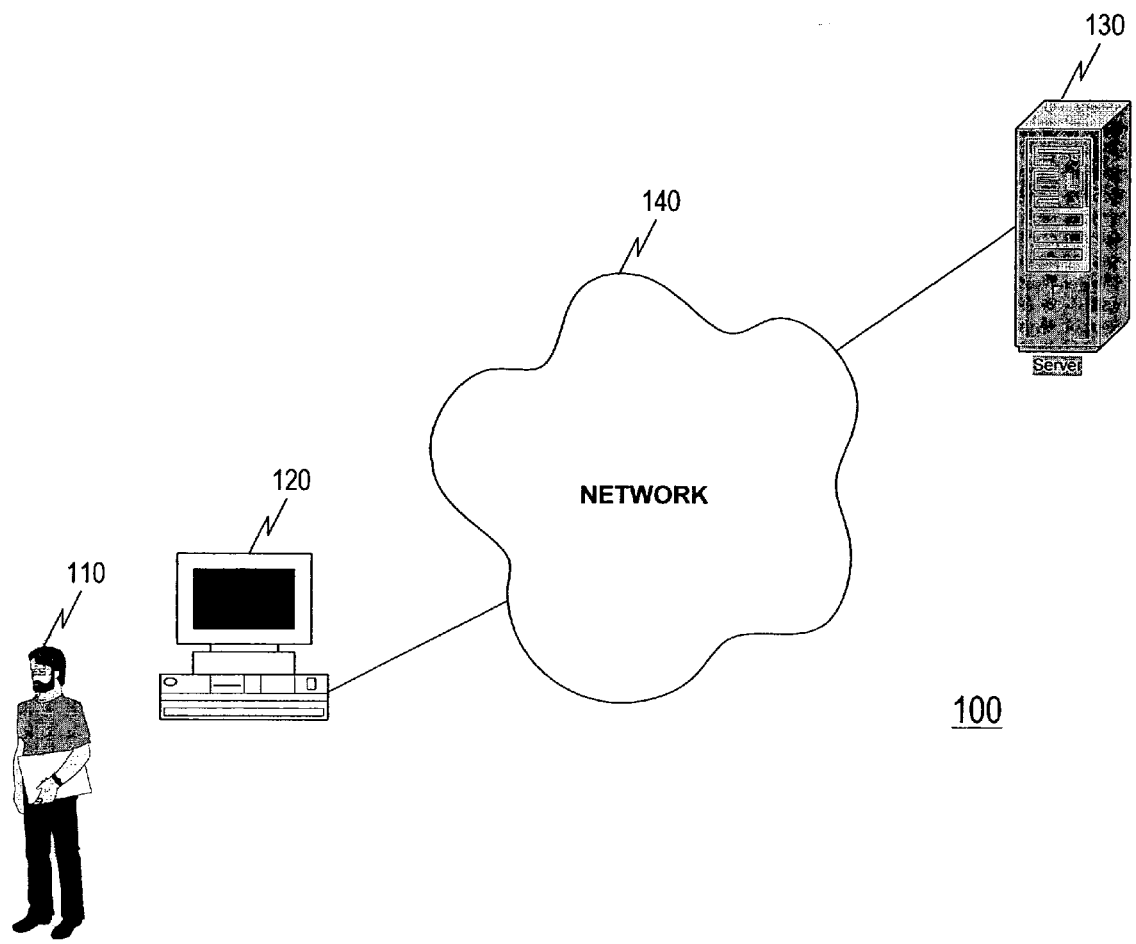
FIG. 1 illustrates a computer network that may be used to implement the present invention.

A preferred embodiment of the invention is discussed in detail below. While specific implementations are discussed, it should be understood that this is done for illustrative purposes only. A person skilled in the relevant art will recognize that other components and configurations may be used without parting from the spirit and scope of the invention.

The present invention is directed to a system and method for providing a web-based operating system and web-based applications to a user via a network. Generally, the present invention eliminates the need for storing a copy of a computer application on a local computer. Rather, the computer application resides on a server. When a user desires to access the computer application, the user selects the application from a desktop that is managed and operated from the server. The computer application (or various aspects, features, or functions thereof) is delivered to the local computer from the server on an "as needed" basis. Such a computer application is referred to as a "server-side" computer application whereas a conventional computer application residing on the local computer is referred to as a "client-side" computer application.

In one embodiment, the present invention provides a web-based operating system that acts as an interface layer between the server-side computer application and the local computer. More particularly, the present invention provides an interface between the server-side computer application and a web-browsing engine operating on the local computer. While described in these terms for purposes of clarity, it will become apparent to those skilled in the art how various aspects of the present invention may be applied to other embodiments.

The present invention provides a component-based environment for the development and deployment of a web-based operating system and web-based applications. Components are small programs, or objects, that perform specific functions and are designed in such a way as to easily operate with other components and applications. The present invention deploys the components within library files as part of a component-based development model. The web-based operating system only downloads those library files that include components needed to execute a particular web-based application a user is accessing. Once downloaded, the components may be reused for other web-based applications when needed.

The component-based development model of the present invention provides a number of benefits. First, the component-based development model provides for faster web-based computer application and web-based operating system development. Components need only be developed once, and thereafter reused as building blocks for many applications. Web-based computer applications developed using the component-based development model are more robust because they use code that is tested, and known to work. Additionally, the present invention provides for loading component libraries once, and referencing them from the web-based computer applications many times. This allows many applications to reference components that were downloaded only once, thereby decreasing the number of downloads and increasing the speed of the web-based operating system.

FIG. 1 illustrates a computer network 100 including a user 110 operating a network-enabled device 120 connected to at least one server 130 via a network 140. Network-enabled device 120 may be any electronic communicating device capable of interfacing with network 140. Such devices may include computers, laptops, telephones, cellular phones, personal data accessories ("PDA"), pagers, web enabled televisions ("WebTV"), or other similar electronic communication devices, as would be apparent. Network 140 may be any form of interconnecting network including an intranet, such as a local or wide area network, or an extranet, such as the World Wide Web, or the Internet. Such networks 140 may include various wireless connections as would be apparent. Server 130 may be any sort of storage device for providing web-related data to user 110 as would be apparent.

Conventionally, user 110 accesses a particular web page using a web browser (also referred to as web-browsing engine) such as Microsoft's Internet Explorer™ or Netscape's Navigator™ operating on network-enabled device 120. In order to access a web page, the web browser sends a request to a particular web site using a Uniform Resource Locator ("URL") address associated with the desired web page. The request is passed through network 140 using an appropriate network protocol. For example, when network 140 comprises the Internet, a Hyper-Text Transfer Protocol ("HTTP") is used that encapsulates the request to facilitate its transmission through network 140. Other network protocols may also be used as would be apparent.

Using the URL address, the request is routed to a server (or servers) 130 hosting the web page. Once located, the appropriate server 130 analyzes the request and sends web-related data corresponding to the request back to network-enabled device 120 using the appropriate network protocol (e.g., HTTP). The browser receives the web-related data at network-enabled device 120. This process of requesting and retrieving web-related data is well known.

Figure 2:
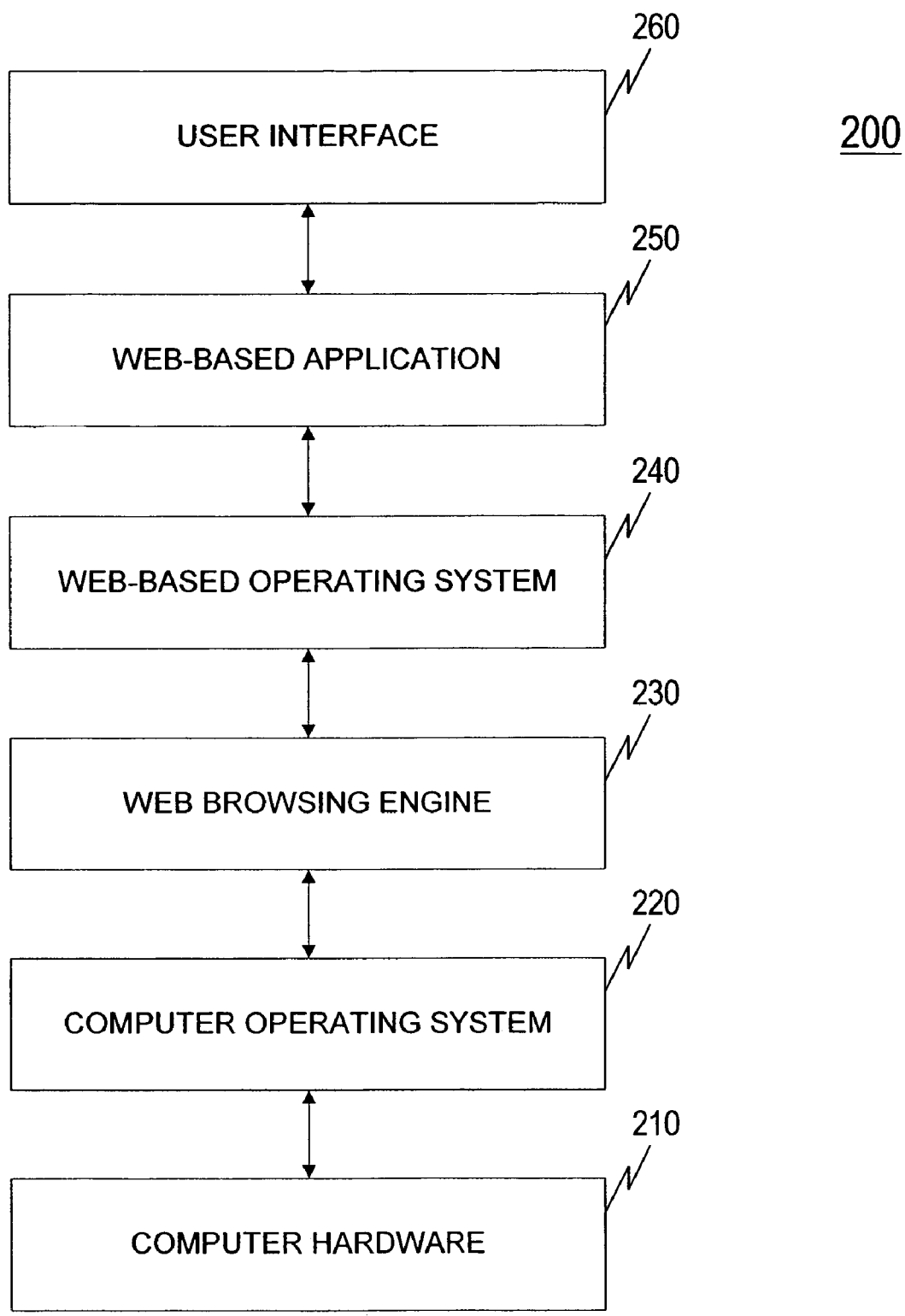
FIG. 2 illustrates a computer system for providing a server-side computer application according to one embodiment of the present invention.

FIG. 2 illustrates the layers of hardware and software included by network-enabled device 120 for providing a server-side computer application to user 110 according to one embodiment of the present invention. Network-enabled device 120 includes a computer platform, or computer hardware, 210. Operating and residing locally on computer hardware 210 is computer operating system 220. Some examples of well-known computer operating systems 220 are Microsoft's Windows 98™, Windows CE™, and Palm OS™. Computer operating system 220 may be any software, firmware or other program logic that provides an interface between the hardware of network-enabled device 120 and a conventional local computer application, as would be apparent.

One such conventional local computer application operating on computer hardware 210 is preferably a web-browsing engine 230, sometimes referred to as a web browser 230. The operation and use of web-browsing engine 230 are generally well known as mentioned above. Web-browsing engine 230 may include for example, Microsoft's Internet Explorer™, version 5.0 or Netscape's Navigator/Communicator™. In a preferred embodiment of the present invention, web-browsing engine 230 is capable of rendering data in the Hypertext Markup Language ("HTML") and Dynamic Hypertext Markup Language ("DHTML") or similar markup language formats, and executing JavaScript code, as is apparent in the following description. More particularly, in the preferred embodiment of the present invention, web-browsing engine 230 is capable of rendering various web page data (DHTML, XML, etc.) to an output device on the client side. In general, web-browsing engine 230 includes interpreters that render web page data to an output device, for example, a graphics display, sound, printer, etc. Typically, computer hardware 210, computer operating system 220 and web-browsing engine 230 comprise network-enabled device 120.

Computer system 200 preferably includes a web-based operating system 240 and a web-based computer application 250. Web-based operating system 240 functions as an interface between web-browsing engine 230 and web-based computer application 250. More particularly, web-based operating system 240 includes an application program interface ("API") that includes a set of components, routines, protocols and tools for building various web-based computer applications 250, all within the framework of web-browsing engine 230. The API includes components, or small programs that perform specific functions and are designed in such a way as to easily operate with other components and applications. Preferably, the components are implemented as JavaScript objects. Such objects are generally well known.

For example, the API includes various components for displaying information (e.g., windows, icons, forms, buttons, etc.) in various manners and locations. The API includes components through which applications may interact with web-browsing engine 230 and computer operating system 220. The API also includes various components for receiving user input (e.g., keyboard input, mouse input, etc.) from various sources and also components for responding to received information in an appropriate manner. With the API, application programmers may use the various components to develop web-based computer applications that run within the context of web-based operating system 240 more rapidly, consistently, and robustly.

While APIs are generally well known, the API of the present invention is novel in that it is preferably written in DHTML, JavaScript™, XML, etc. The API may also include various compiled portions (e.g., C++, etc.) for complex or time sensitive operations. This is significant in that web-browsing engine 230 executes or interprets these other forms of web data into an HTML web page that is then displayed. In effect, this enables various functions of web-based computer application 250 to be handled on network-enabled device 120 (i.e., client-side) rather than server 130 (i.e., server-side). This is discussed in further detail below.

Computer system 200 also includes a user interface 260 that allows user 110 to navigate and control web-based computer application 250. Together with web-based computer application 250 and web-based operating system 240, user interface 260 preferably operates in a manner similar to a user interface associated with a conventional client-side computer application of a similar type. According to the present invention, a user interface of a server-side, or web-based, version of a word processor preferably operates in a manner similar to that of a conventional, local version of a word processor. Computer applications with similar user interfaces are often said to have a similar "look and feel." While having a user interface for web-based computer application 250 that is similar to that of a conventional client-side application may speed the migration of users 110 to web-based computer applications 250, those skilled in the art would recognize that this is not necessary.

The present invention enables the development, implementation, and deployment of web-based operating system 240 and web-based computer application 250. A web-based application development environment is provided that enables developers to develop web-based computer applications 250 using a component-based development model. Developers reference components, and component library files in their web-based computer application code. Component library files that include the referenced components are loaded into web-based operating system 240 the first time they are needed. Since the component library files are only loaded when they are actually needed, web-based operating system 240 and web-based computer application 250 downloads only that code that is needed for web-based operating system 240 and web-based computer application 250 to execute on network-enabled device 120.

The present invention enables the development and implementation of web-based operating system 240 and web-based computer application 250 by providing a top-level page that executes within the context of web-browsing engine 230. The top-level page is essentially a sophisticated web application that includes web page data (DHTML, XML, JavaScript, VBScript, etc.) that is processed by web-browsing engine 230. The basic functionality of web-based operating system 240 is included in the top-level page. Additional functionality for web-based operating system 240 and web-based computer application 250 is included in library files.

Two of the primary types of library files are component library files and application library files. Component library files include component definitions and logic that allow applications running within web-browsing engine 230 to instantiate component objects. Application library files are files that include an application object. The application object identifies application program logic within the application library file and allows the application program logic to be incorporated into the top-level page so that web-browsing engine 230 may execute the application. Developers of web-based computer application 250 write the code in the form of application library files.

The top-level page accesses the library files through the library manager. The library manager is a set of functions and objects, in the top-level page that loads the components and application program logic from library files into the top-level page. Once the components and application program logic are loaded into the top-level page, the web application is executed by web-browsing engine 230.

The operation of web-based operating system 240 and web-based computer application 250 begins when user 110 downloads the top-level page to web-browsing engine 230 running on network-enabled device 120. Import statements in the top-level page identify core component libraries that provide components and functionality that the top-level page requires to operate as web-based operating system 240. The library manager reads the import statements, identifies the location of the core component libraries and loads them into the top-level page. Preferably, the library manager creates a new context in the top-level page and loads the components from the library file into the context. Preferably, the new context is a frame element within the top-level page, such as a frame, iframe, layer, etc. The library manager then maps the identity of the new context (e.g., frame element) to the components and identity of the library files loaded into the new context. This mapping creates a way for the library manager to determine that a particular library file has already been loaded, and map references to a component into the context that includes that component.

After the core component libraries have been loaded, the top-level page is ready to load and execute an application library file. The application library file provides the program logic to function as an application within the top-level page and web-browsing engine 230. Preferably, the top-level page contains a reference to an application library, such as a URL address, or other information identifying an application. Alternately, user 110 may provide the URL address, or surf to the location of web-based computer application 250 according to the present invention. Regardless of the source of the reference to the application library file, the library manager begins the process of running the application within the context of web-browsing engine 230 by accessing the application library file.

The library manager first retrieves the application library file, and then begins the process of loading the application library file into the top-level page. As part of the loading process, the library manager first determines if the application library file includes any import statements that identify other component libraries. Import statements identify component library files and indicate that the application library file includes program logic that instantiates components from those component library files. If the application library includes import statements identifying other component libraries, the library manager loads the component libraries in the same manner as the core component libraries, described above. After all component libraries associated with the application library have been loaded into the top-level page, the library manager begins loading the application library into a new context within the top-level page.

Preferably, the application library file program logic uses components from the loaded component libraries to implement the functions of the application. Examples of the types of components that an application library might use are components to draw windows, components to provide menu bars, components to implement business logic, etc. Within the application library file, components are referred to by the component library file name and component name, (e.g., LibraryFileName.ComponentName). This method of referring to a component, however, is not preferred within the top-level page, since component references typically need to identify the top-level page context within which the component is defined (e.g., ContextName.ComponentName). The identity of the top-level page context was defined when the library manager loaded the component library file into the top-level page. Within the top-level page, component references from within the new context identity that includes the application program logic should refer to the context of the component to which they refer. As such, library manager replaces the component library file name portion of the component reference with the identity of the context that the component library file was loaded into.

After the context identity component file name swap has been completed, and the program logic of the application library file has been loaded into a new context, the web-browsing engine 230 executes the new application in the top-level page, thereby rendering the application functionality of the application library file to user 110 at network-enabled device 120.

Figure 3:
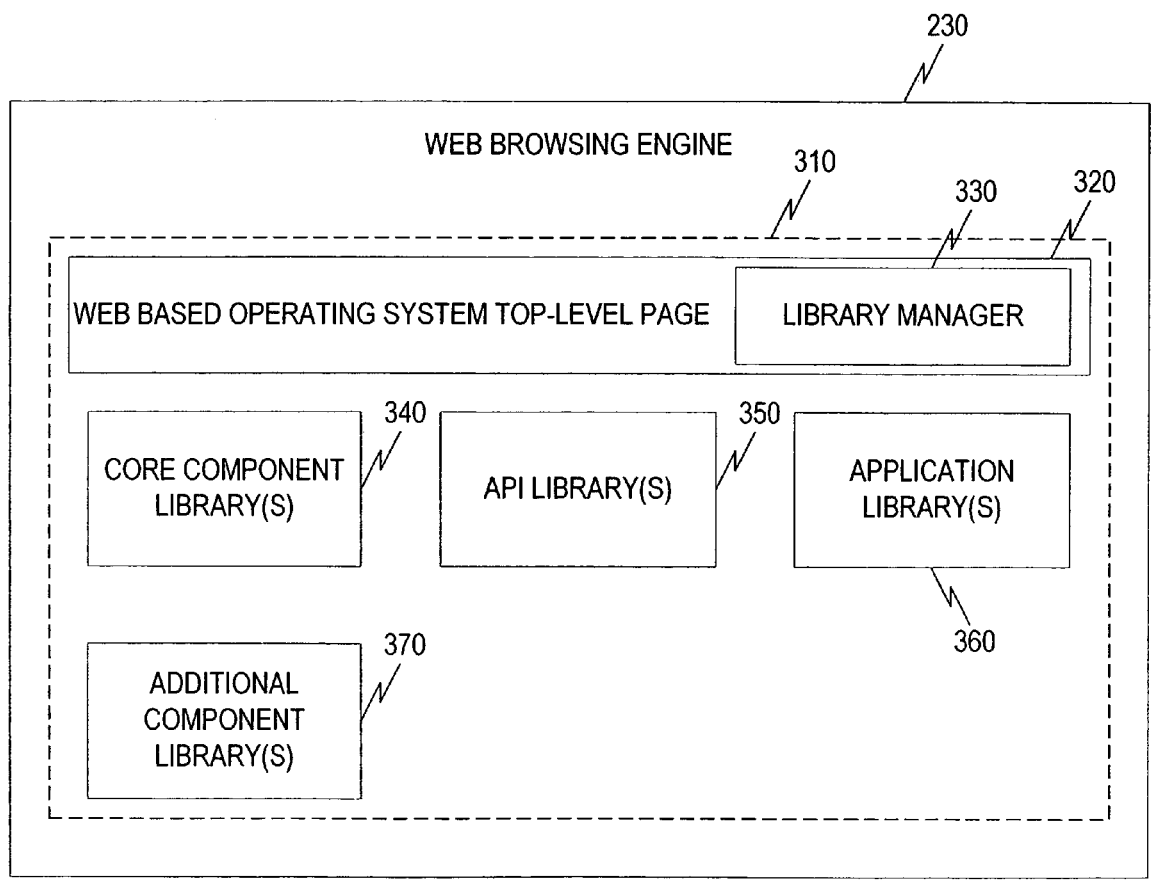
FIG. 3 illustrates an exemplary embodiment of the present invention.

FIG. 3 illustrates an exemplary embodiment of the present invention. Web application client 300 is the software installed on network-enabled device 120 that enables user 110 to interact with web-based computer application 250 via user interface 260. Web application client 300 includes the software necessary to implement the client-side of a network-based application, namely web-browsing engine 230 and operating system and application layer 310. Preferably, network-enabled device 120 already includes a web-browsing engine 230. Accordingly, in the present invention operating system and application layer 310 or portions thereof are downloaded from a server, such as server 130, to network-enabled device 120 when user 110 chooses to use a web-based application. Alternatively, web-browsing engine 230 may be downloaded with operating system and application layer 310. One reason it may be preferable to download web-browsing engine 230 with operating system and application layer 310 is that the particular web-browsing engine on network-enabled device 120 is incompatible with operating system and application layer 310.

The various elements of operating system and application layer 310 provide the functionality of web-based operating system 240 and web-based computer application 250. Although component and API based systems often blur the line of demarcation between operating system and application, generally, top-level page 320, library manager 330, core component library 340, and API library 350 function as web-based operating system 240. Similarly, application library 360 and additional component library 370 function as web-based computer application 250.

The elements of operating system and application layer 310 are loaded into the browser context of web-browsing engine 230, and are executed, or interpreted, in a manner consistent with other web documents. Moreover, the components of operating system and application layer 310 include program code, such as HTML, DHTML, JavaScript™, VBScript™, XML, etc., that executes within the context of web-browsing engine 230.

Top-level page 320 is the main application page, or document, into which other web-based application code is loaded. When user 110 accesses server 130 to download web-based operating system 240 and web-based computer application 250, top-level page 320 is the first page transmitted to network-enabled device 120. Top-level page 320 may include HTML, DHTML, JavaScript, VBScript, XML, and any other data that web-browsing engine 230 may process in order to render web-based computer application 250 to user 110. Top-level page 320 may also include references to other pages, such as script files, HTML source files, etc., which web-browsing engine 230 incorporates when top-level page 320 is loaded.

Top-level page 320 provides the core functionality for web-based operating system 240. Preferably, the core functionality is implemented as JavaScript functions, objects, constructors and prototypes, collectively referred to herein as JavaScript program elements. Constructors and prototypes are JavaScript programming elements that define objects that may be instantiated or used as a basis for a type of object oriented class-inheritance. The JavaScript program elements are made available in top-level page 320 to other portions of the web-based operating system 240 and web-based computer application 250 to form the basis of an API.

For example, the core functionality provided by top-level page 320 includes event handlers, core system objects, and library manager 330. Event handler JavaScript program elements handle events raised by web-browsing engine 230, and may be incorporated to handle user input and events raised by other portions of web-based computer application 250. System objects are JavaScript program elements for managing the execution, resource management and administration of web-based operating system 240. System objects may include, for example, objects to run portions of an application within top-level page 320, trigger an event of an object, return the location and dimensions of windows, etc.

Top-level page 320 includes library manager 330, which provides the functionality to load and reload core component library 340, API library 350, application library 360, and additional component library 370 (i.e., library files 340–370). It should be noted that although library files 340–370 are shown as discrete elements for convenience, in actual implementation, the present invention contemplates any of library files 340–370 may include a number of library files, as would be apparent. Library files 340–370 include components and program logic that are loaded into top-level page 320 to add additional functionality to operating system and application layer 310. For example, core component library 340 includes the core API components for web-based operating system 240. API library 350 includes components available for development of applications, such as web-based computer application 250. Application library 360 includes components and program logic to provide application functionality to top-level page 320. Application library 360 includes, for example, application objects that may be executed within the context of web-browsing engine 230 once the application library has been incorporated into top-level page 320. Additional component library 370 includes components that may be loaded by library manager 330 into top-level page 320 for added functionality. Additional component library 370 may include, for example, components developed by third-party developers that may be incorporated into applications in application library 360.

Figure 4:
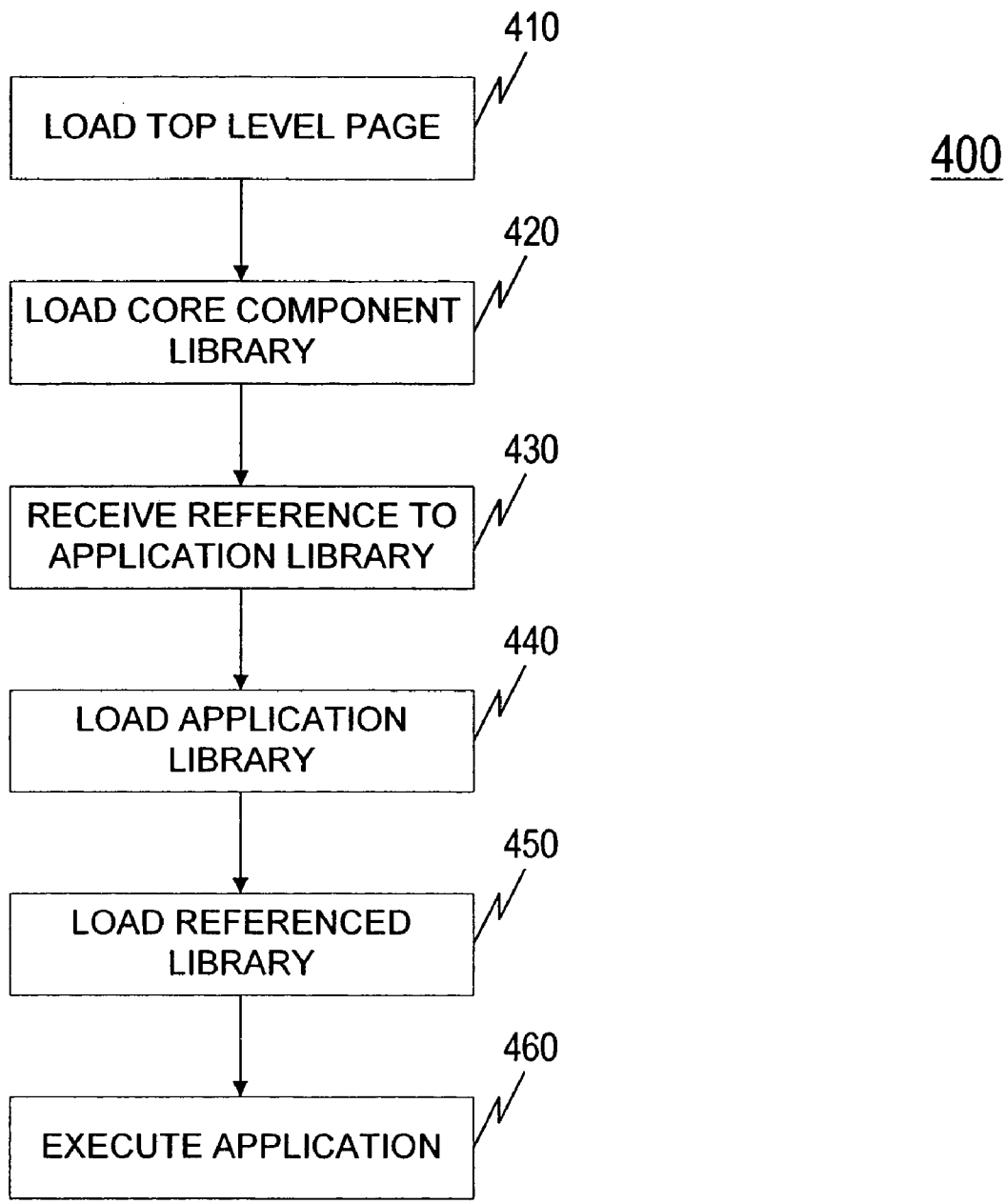
FIG. 4 illustrates the process of running a web-based application according to the present invention.

FIG. 4 illustrates flowchart 400, the process of running a web-based application according to the present invention. The process of running web-based computer application 250 within the context of web-browsing engine 230 begins in step 410. In step 410, user 110 accesses top-level page 320 at server 130 and loads it into web-browsing engine 230 at network-enabled device 120. The user may access top-level page 320 in a number of ways, including for example, accessing it via the Internet, an intranet, a wireless network, via a locally cached copy on network-enabled device 120, etc. After top-level page 320 has been loaded, web-browsing engine 230 begins processing the script, HTML, and/or other data, to cause the implementation of steps 410–460 in the process of flowchart 400.

In step 420, library manager 330 loads core component library 340 into top-level page 320. Loading creates a new context in top-level page 320 and loads the components and JavaScript program elements and other data from a library file into the new context. Loading core component library 340 incorporates the HTML, script, JavaScript program elements, and any other data of core component library 340 into top-level page 320. It should be noted that although step 420 specifies loading core component library 340, library files from API library 350, or application library 360 may also be loaded in step 420 as would be apparent. The process of loading library files into top-level page 320 is described in further detail below, in conjunction with FIG. 6. Generally, however, import statements in top-level page 320 identify library files, such as core component library 340, to be loaded. Import statements in top-level page 320, and library files in general identify library files to be loaded.

Library manager 330 retrieves the library file, and creates a context in top-level page 320 into which the data from the library file is loaded, such as core component library 340 in step 420. An example of such a context is an inline floating frame ("iframe") or Netscape™ layer. Both iframes and layers are separate elements within top-level page 320 that allow JavaScript program elements or other data to be inserted into top-level page 320 and may be executed as applications by web-browsing engine 230. Library manager 330 creates the context in top-level page 320, using a script, or command executed by web-browsing engine 230. Examples of the types of script commands that allow the library manager 330 to create the context include the insertAdjacentHTML or new Layer( ) commands. After the library manager 330 creates the context, the JavaScript program elements and data from core component library 340 is inserted into the new context. After library manager 330 loads core component library 340 in step 420, the process of flowchart 400 continues at step 430.

In step 430, top-level page 320 receives a reference to application library 360. An application library is a library file that instantiates an application object. An application object is a JavaScript program element that identifies an application and it's associated program logic within a library file. Top-level page 320 may receive the reference to application library 360 in a number of ways, including a URL address, or other information identifying application library 360 included in top-level page 320 or another library file. After top-level page 320 receives the reference to application library 360 in step 430, the process of flowchart 400 continues in strep 440. In step 440, library manager 330 loads application library 360 into a new context within top-level page 320, as described above. After step 440, the process of flowchart 400 continues in step 450.

In step 450, library manager 330 loads libraries referenced by application library 360 loaded in step 440. Application library 360 references other libraries via import statements. Import statements cause library manager 330 to load the referenced libraries. In step 450, library manager 330 loads any library files referenced by application library 360. Once the referenced library files are loaded in step 450, the process of flowchart 400 continues in step 460.

In step 460, web-browsing engine 230 executes the application loaded in step 440. Library manager 330 has incorporated new application data, such as JavaScript program elements, components and other data into top-level page 320. The new application data is included in new context elements, created by library manager 330. Web-browsing engine 230 executes the application data within the new contexts, and renders the application at network-enabled device 120 to user 110.

Figure 5:
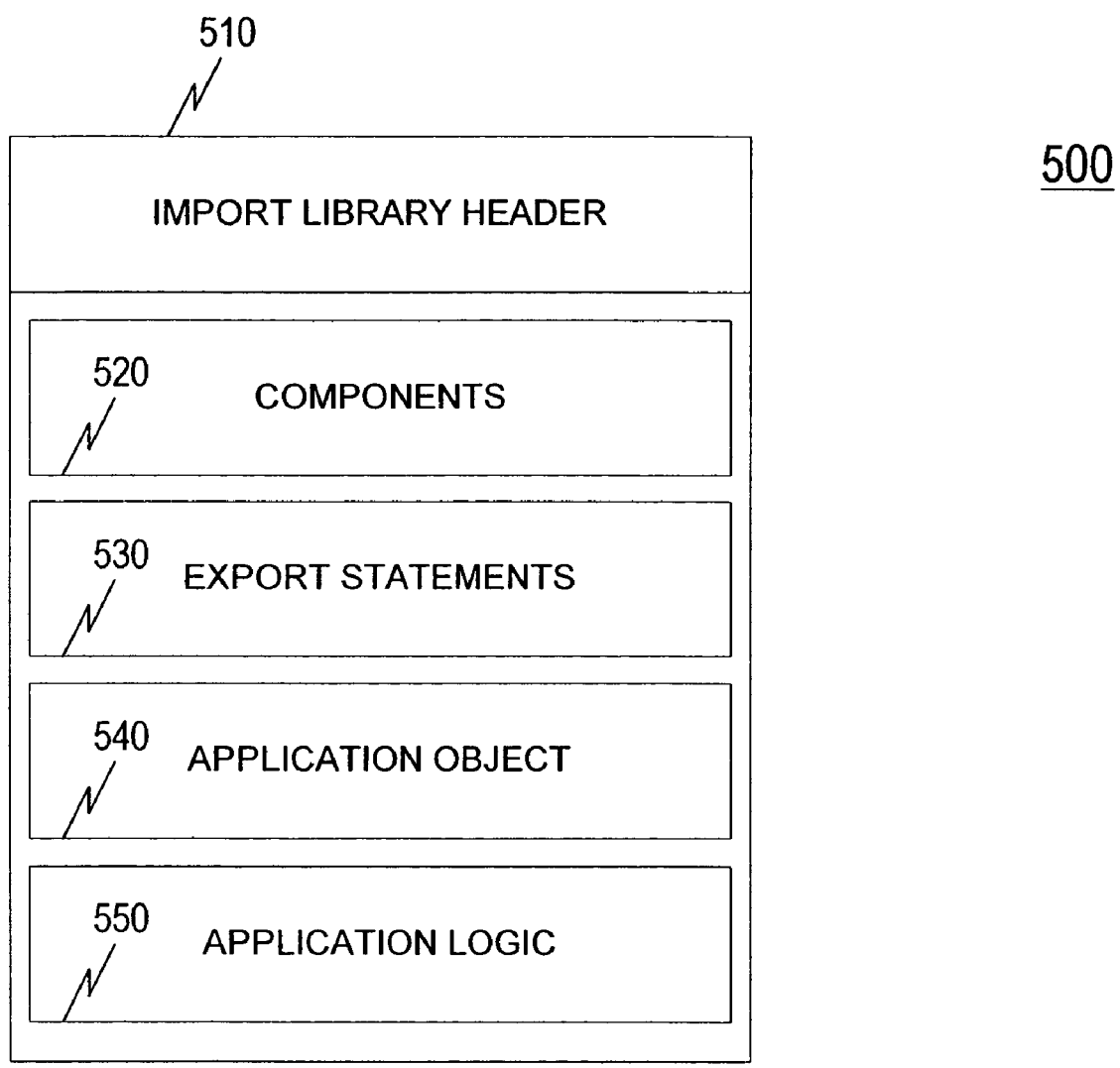
FIG. 5 illustrates a file according to the present invention.

FIG. 5 illustrates a file according to the present invention. Library file 500 includes import library header 510, components 520, export statements 530, application object 540, and application logic 550. It should be noted that library file 500 is depicted as including elements 510–550 for illustrative purposes only, and in actual implementation, library files may include as many or as few of elements 510–550 as would be apparent. Library file 500 may include import library header 510. Import library header 510 identifies additional library files to be loaded when library file 500 is loaded. Although import library header 510 may reference any type of library file, for purposes of explanation, library files referenced in import library header 510 will be referred to as "sub-library files." Sub-library files are loaded by library manager 330 as described above.

Library file 500 may include components 520. Components 520 provide functionality to web-based operating system 240 and web-based computer application 250. Preferably, a component is any programmatic element in library file 500, such as JavaScript program elements, objects, constructors, prototypes, methods, properties, events, etc.

Library file 500 may also include export statements 530. Export statements identify particular components of components 520 that are made available to library files that import library file 500. Consider, for example, the case in which library file 500 declares which sub-library files it needs for proper execution in import library header 510. When library file 500 is loaded, library manager 330 loads the sub-libraries identified in import library header 510. The sub-libraries make their components available to library file 500 through a process called exporting. If a sub-library file is defined with a component that is exported through an export statement in the sub-library, library manager 330 incorporates the component's functionality in the program logic of library file 500. When web-browsing engine 230 runs the application, library file 500 may properly reference and use the exported sub-library components.

Library file 500 may also include application object 540, which is an instance of an object defined in top-level page 320. Application object 540 identifies library file 500 as an application library file. Application library files contain program logic and may execute as application within a new context, such as an iframe or layer, within top-level page 320. For example, an application library file may provide the functionality for a window of a word processor, a menu bar, a spreadsheet program, etc. Application logic 550 is the program logic that implements the application library file. When top-level page 320 references the application library file, preferably via a URL address, the file is loaded and the function identified by the application object is executed by web-browsing engine 230.

Figure 6:
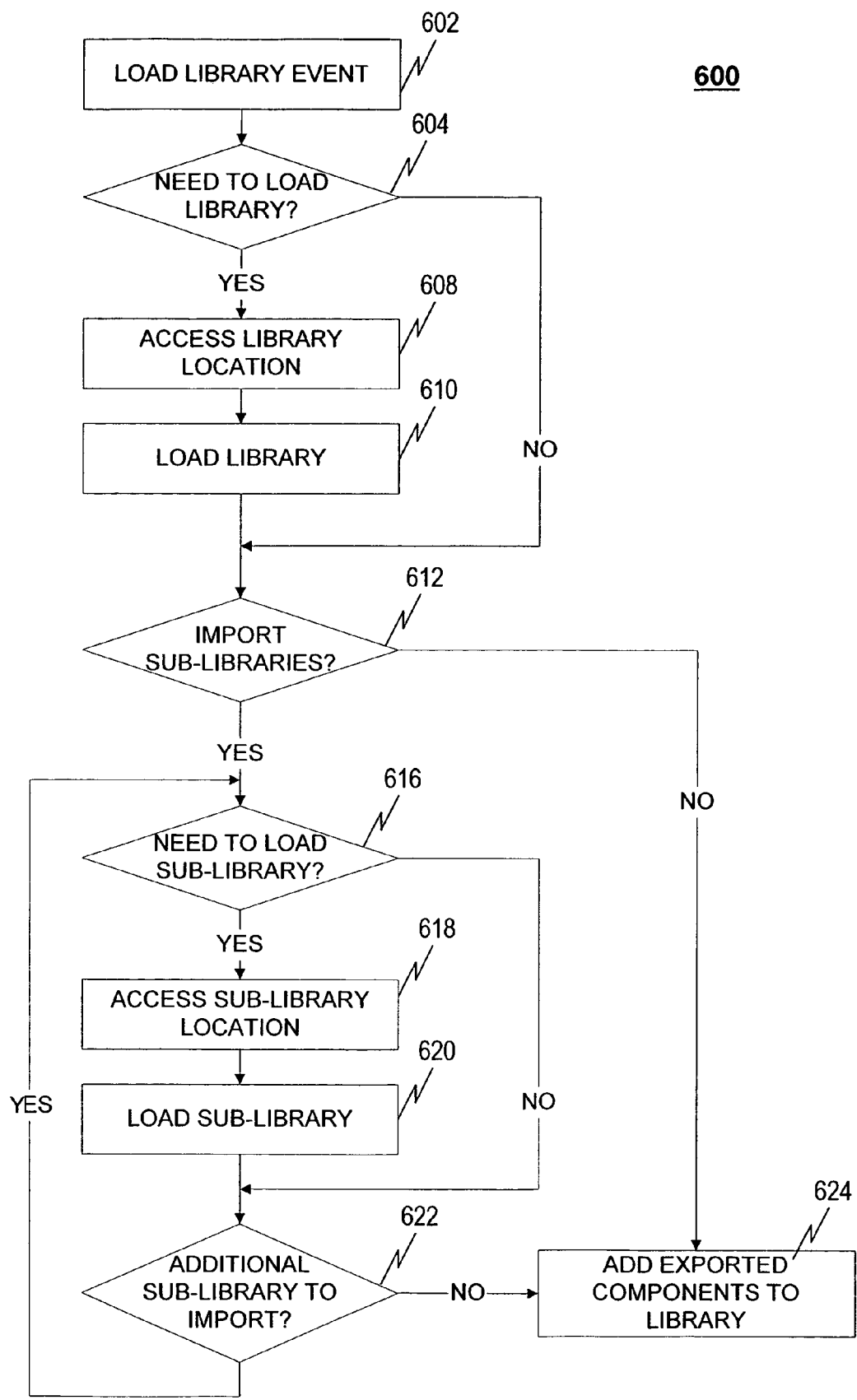
FIG. 6 illustrates the process of loading a file according to the present invention.

FIG. 6 further illustrates the process of loading library file 500 according to the present invention. The process of flowchart 600 begins in step 602, with the occurrence of a load library event. A load library event identifies a library file, described herein as library file 500 for illustrative purposes, and is any event that causes library manager 330 to load library file 500. Examples of load library events are sub-libraries identified by import library header 510 in library file 500, a reference to the URL address of an application library file within top-level page 320, an import library statement within top-level page 320, etc. After the occurrence of a load library event, the process of flowchart 600 continues in step 604.

In step 604, library manager 330 determines if library file 500 has already been loaded into a new context in top-level page 320. Library manager 330 loads library files by creating a new context within top-level page 320, such as an iframe or layer, and loads the library file into it. Library manager 330 then writes to a data structure, such as an array, mapping the newly created context to the particular library file loaded. In step 604, library manager 330 checks the data structure to determine if library file 500 has yet been loaded. If library manager 330 determines that library file 500 has not yet been loaded, the process of flowchart 600 continues in step 608.

In step 608, library manager 330 accesses and retrieves library file 500 from its location. The method by which library manager 330 accesses library file 500 is dependent upon the nature of the load library event and library file 500. For example, the locations of core component library 340 and API library 350 should be identified in top-level page 320, since these libraries form part of the core of web-based operating system 240. Application library 360, and additional component library 370, on the other hand, may originate from third party developers, and their location may not be known before the load library event occurs.

Preferably, top-level page 320 includes a data structure that maps an identifier for library file 500, such as the name of the file, or other uniquely identifying information, to the location of library file 500. Library file 500 may be located anywhere on network 140, server 130, network-enabled device 120, etc. In step 608, library manager 330 accesses the data structure, determines the location of, and retrieves, library file 500. In an alternate embodiment, the load library event may identify the location of library file 500, such as the URL address of library file 500. In such cases, library manager 330 accesses the location of library file 500 identified by the load library event. After library manager 330 accesses and retrieves library file 500 in step 608, the process of flowchart 600 continues in step 610. In step 610, library manager 330 creates a new context in top-level page 320 and loads library file 500 into it. In step 610, library manager 330 creates an entry in a data structure in top-level page 320 that maps the identifier of library file 500 to the new context. After step 610, the process of flowchart 600 continues in step 612.

If, on the other hand, in step 604, library manager 330 determines that library file 500 has already been loaded, the process of flowchart 600 continues in step 612. Library manager 330 determines that library file 500 has already been loaded by checking the data structure in top-level page 320 where the identifier of library file 500 is mapped to the new context. If the mapping exists, library manager 330 determines that library file 500 has already been loaded.

In step 612, library manager 330 determines if library file 500 identifies any sub-libraries to import. Library file 500 identifies sub-library files to import in import library header 510, as described above. If library manager 330 determines library file 500 does not identify sub-library files in import library header 510, the process of flowchart 600 continues in step 624. If, on the other hand, library file 500 includes sub-libraries in import library header 510, the process of flowchart 600 continues in step 616. It should be noted, however, that the process for importing a sub-library is the same as that for any library. When library manager 330 imports a sub-library file, the sub-library file is loaded with the process of flowchart 600. Using the process of flowchart 600 to load sub-library files ensures recursive library file loading. For example, sub-library files identified in import library header 510 may themselves import additional sub-library files (i.e., sub-sub-library files). As such, the process of flowchart 600 ensures that all sub-library files identified in import library header 510 are loaded. If library manager 330 determines that library file 500 includes an import library header 510 referencing sub-library files, the process of flowchart 600 continues in step 616.

In step 616, library manager 330 determines whether the sub-library identified by import library header 510 has yet been loaded into a context within top-level page 320. Library manager 330 checks a data structure in top-level page 320 to determine if the sub-library file identified in import library header 510 is associated with a context within top-level page 320. If the sub-library file has not yet been loaded, the process of flowchart 600 continues in step 618. In step 618, library manager 330 accesses the location of, and retrieves the sub-library file. The location of the sub-library file may be stored in a data structure of top-level page 320, or alternatively, passed to library manager 330 with the import statement in import library header 510. After library manager 330 accesses and retrieves the sub-library in step 618, the process of flowchart 600 continues in step 620. In step 620, library manager 330 loads the sub-library file, as described above. After library manager 330 loads the sub-library file in step 620, the process of flowchart 600 continues in step 622.

If, on the other hand, library manager 330 determines, in step 616, that the sub-library file identified in import library header 510 has already been loaded, the process of flowchart 600 continues in step 622. In step 622, library manager 330 determines if import library header 510 identifies additional sub-library files to be loaded. If import library header 510 identifies additional sub-library files, the process of flowchart 600 continues at step 616, where steps 616–622 are iterated until all of the sub-library files have been loaded. If, on the other hand, library manager 330 determines there are no additional sub-library files to load, the process of flowchart 600 continues in step 624.

In step 624, library manager 330 adds components and JavaScript program elements exported by sub-library files to library file 500. The exported components are added to library file 500 for purposes of code reuse and rapid application development, as are the goals of the typical component-based development model. For each component exported by a sub-library, library manager 330 creates an entry in a data structure, such as an array, in top-level page 320. The entry identifies the sub-library that includes the component, a component identifier (i.e., name), and the context identifier, such as the name of the iframe or layer, into which the sub-library was loaded. When library file 500 is loaded into a new context, library manager 330 replaces the references to sub-library components with the context identifier for the sub-library and component name. This, effectively, maps the components from the sub-library context into the context of library file 500 via conventional inter-frame scripting.

In conventional JavaScript inter-frame scripting, program logic in a first context is able access the components and objects within a second context. The program logic in the first context, however, must explicitly identify the second context when instantiating objects defined within the second context. Because the present invention loads library files dynamically, the identities of contexts that include components and JavaScript program elements are not fixed, and therefore cannot be explicitly identified by program logic of application library files.

Library manager 330 removes the requirement that library file 500 explicitly refer to the context of a sub-library by maintaining a map between components, and the identity of library file contexts that include them. When a new library file is loaded, library manager 330 replaces references to sub-library components in the new library file with the identities of the contexts in which the sub-library components are loaded. When the new library file is loaded into a context, therefore, it explicitly identifies the context of the sub-library that includes the components.

In summary, the present invention provides a component-based development model for the development and implementation of web-based operating system 240 and web-based computer application 250. Components from core component library 340 and API library 350 are loaded into top-level page 320 by library manager 330 for use by web-based operating system 240. Library manager 330 loads application library 360 into top-level page 320, and also loads any additional component library 370 referenced by application library 360. Once application library 360 and any related component libraries have been loaded into top-level page 320, web-browsing engine 230 executes top-level page 320 to provide web-based operating system 240 and web-based computer application 250 functionality to user 110 at network-enabled device 120.

Typically, applications executing within the context of web-browsing engine 230 are not persistent. Top-level page 320 and the associated component and application library files are preferably downloaded via network 140 to network-enabled device 120 and execute within the context of web-browsing engine 230. When user 110 exits the browser application or reboots network-enabled device 120, the downloaded files are usually discarded. Upon restart, or when reloading web-browsing engine 230, user 110 accesses top-level page 320 and the associated application and component library files by, once again, accessing them via network 140. The operation of web-based operating system 240 and web-based computer application 250, therefore is not persistent. This lack of persistence of the web-based operating system and web-based computer applications provides for a payment model based on the usage of particular web-based computer applications, since user 110 must have access to download for each use. Pay per use charges with web-based computer applications are a more desirable alternative to the pay per instance of conventional locally loaded computer application.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for executing a server-side application using a browser, comprising:
   loading a top-level page into an existing context of the browser, said top-level page referencing a component library file;
   loading said component library file, said component library file including an application program interface having web-based operating system components that are executed within the existing context of the browser;

transmitting a request for a server-side application from the browser;

loading an application library file corresponding to the server-side application in response to the request, said application library file referencing said application program interface; and executing said application library file, wherein the web-based operating system components and the application library file provide functions of the server-side application within the browser.

2. The method of claim 1, wherein said top-level page provides an execution context for said component library file and for said application library file.

3. The method of claim 1, wherein said top-level page includes a library manager for loading additional library files referenced by the application library file.

4. The method of claim 1, wherein said loading said component library file further comprises loading said component library file into a new context within said top-level page.

5. The method of claim 4, wherein said new context is an iframe.

6. The method of claim 4, wherein said new context is a layer.

7. The method of claim 1, wherein said loading said application library file further comprises loading said application library file into a new context within said top-level page.

8. The method of claim 7, wherein said new context is a new iframe.

9. The method of claim 7, wherein said new context is a new layer.

10. The method of claim 1, further comprising loading a sub-library file in response to a reference to said sub-library file in said component library file.

11. The method of claim 1, further comprising loading a sub-library file in response to a reference to said sub-library file in said application library file.

12. The method of claim 1, wherein said application library file is loaded in response to user interaction with the browser.

13. A method for implementing a web-based application program interface, comprising:

loading a top-level page into a web-browser, said top-level page adapted to be processed within an existing context of the web-browser;

receiving a request to load a component library file, said component library file including an application program interface having web-based operating system components that are executed within the existing context of the browser;

determining if said component library file has been loaded;

when the component library file has not been loaded, transmitting a request for a server-side application from the browser;

loading said component library file into a new context in said top-level page if said component library file has not been loaded;

determining if said component library file references an application library file;

determining if said application library file has been loaded; and loading said application library file into a new context in said top-level page if said application library file has not been loaded, wherein the application library file references the application program interface; and executing the application library file, wherein the web-based operating system components and the application library file provide functions of the server-side application within the browser.

14. The method of claim 13, wherein said top-level page includes a library manager for loading library files.

15. The method of claim 13, wherein said request is included in said top-level page.

16. The method of claim 13, wherein said request is generated by user interaction with the web-browser.

17. The method of claim 13, wherein said request is generated by a web-based application executing in the web-browser.

18. The method of claim 13, wherein said new context is an iframe.

19. The method of claim 13, wherein said new context is a layer.

20. A computer program product for enabling a processor in a computer system to implement a system for executing a server-side application within a browser, said computer program product comprising:

a computer usable medium having computer readable program code means embodied in said computer usable medium for causing a program to execute on the computer system, said computer readable program code means comprising:

means for loading a top-level page into an existing context of the browser, said top-level page referencing a component library file;

means for loading said component library file, wherein said component library file includes an application program interface having web-based operating system components that are executed within the existing context of the browser;

means for transmitting a request for a server-side application from the browser;

means for loading an application library file, wherein said application library file references said application program interface; and means for executing said application program interface referenced by said application library file, wherein the web-based operating system components and the application library file provide functions of the server-side application within the browser.

21. A system for enabling the execution of a server-side application within a browser, the system comprising:

a processor; and a memory in operative communication with the processor, the memory for executing a plurality of processing instructions for directing the processor to:

load a top-level page into an existing context of the browser, said top-level page referencing a component library file;

load said component library file, the component library file including an application program interface having web-based operating system components that are executed within the existing context of the browser;

transmit a request for a server-side application from the browser;

load an application library file corresponding to the server-side application in response to the request, said application library file referencing said application program interface; and execute said application library file, wherein the web-based operating system components and the application library file provide functions of the server-side application within the browser.

* * * * *